J. ELLS.
Revolver.
No. 806. Reissued Sept. 6, 1859.
Fig. 1.
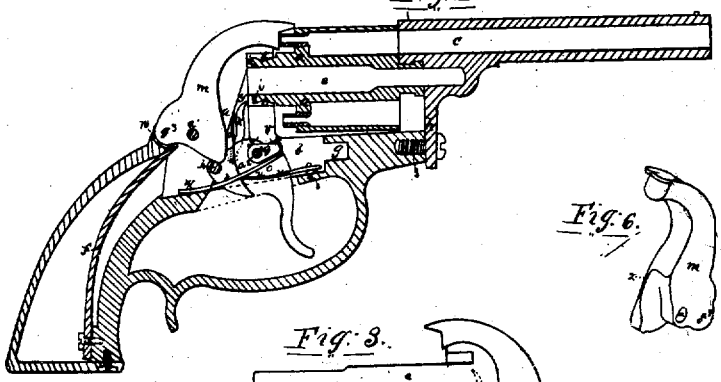
Fig. 6.
Fig. 3.
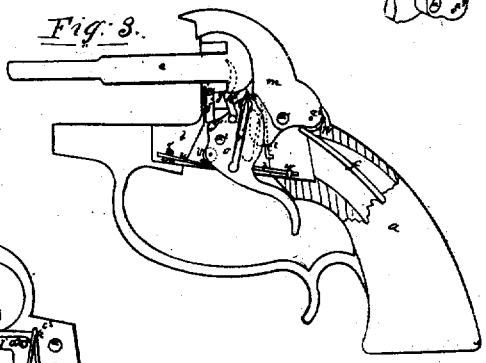
Fig. 4.
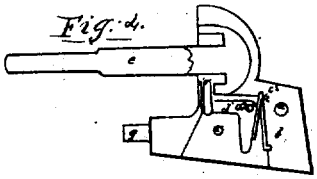
Fig. 7.
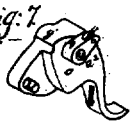
Fig. 5.
Fig. 2.
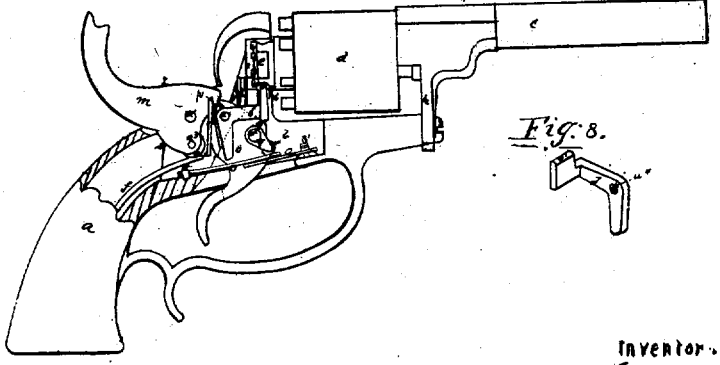
Fig. 8.
Witnesses
A. C. Howard
R. B. Campbell
Inventor.
Josiah Ells
N. PETERS, PHOTO-LITHOGRAPHER, WASHINGTON, D. C.

UNITED STATES PATENT OFFICE.

JOSIAH ELLS, OF PITTSBURG, PENNSYLVANIA, ASSIGNOR TO WM. S. LAVELEY AND JAMES M. COOPER.

IMPROVEMENT IN REVOLVING FIRE-ARMS.

Specification forming part of Letters Patent No. 11,419, dated August 1, 1854; Reissue No. 806, dated September 6, 1859.

*To all whom it may concern:*

Be it known that I, JOSIAH ELLS, of Pittsburg, in the county of Allegheny and State of Pennsylvania, have invented certain new and useful Improvements in Revolving-Breech Fire-Arms, applicable to guns, rifles, and pistols; and I do hereby declare that the following is a full, clear, and exact description thereof, reference being had to the annexed drawings, forming part of this specification, in which—

Figure 1 is a sectional side view of a revolving pistol constructed with my improvements, excepting that the locking-bolt is removed to exhibit the other parts more clearly. Fig. 2 is a side view of a similar pistol, exhibiting the several parts of the lock in their position when the trigger is drawn back and the pistol is cocked ready for firing. Fig. 3 is a sectional view of the stock and lock-frame of the pistol, showing the reverse side of the interior of the lock, the several parts being in their position when the trigger is fully drawn back, immediately after firing and before the trigger is released. Fig. 4 is a sectional view of the lock-frame with all the parts removed excepting the locking-bolt and its spring. Fig. 5 is a view of the under side of the lock-frame, all the works of the lock being removed. In Fig. 1 the parts of the lock are in a state of rest, in the position they occupy before the trigger is pulled. In Fig. 2 the hammer is raised by the action of the vibrating stud on the cam-shaped toe of the hammer, and is at full-cock, and the cam-shoulder of the trigger, pressing the level face of the locking-bolt against the squared surface of the neck of the revolving chamber, locks it in the proper position. The slightest touch on the trigger would now fire the pistol. In Fig. 3 the hammer has fallen, and the trigger, if released, would instantly regain its position for repeating the fire. Fig. 6 is a perspective view of the hammer, designed to show more clearly the chamfered edge against which the vibrating stud on the trigger works. Fig. 7 is a perspective view of the trigger, exhibiting the position of the vibrating-stud and of the shoulder on which the trigger-spring rests. Fig. 8 is a perspective view of the locking-bolt.

In the several figures like letters of reference denote similar parts of my pistol.

My improvement consists in the use of a stud in the trigger, vibrating laterally, in combination with a beveled-edged hammer, for the purpose of raising the hammer to stand at cock, or firing it at once by simply pulling the trigger; and in the combination and use of a beveled-edged hammer and trigger with vibrating stud, and cam on the trigger-spring, for the purpose of operating the pistol and retaining the parts in their position of full-cock; also, the combination of the notch or depression in the toe of the hammer, in combination with the laterally-vibrating stud, for the purpose of preventing the slipping or displacement of the stud when the hammer stands at full-cock, and indicating that point to the finger of the operator; also, in the use of a locking-bolt operated by the trigger, in combination with a hexagonal neck to the breech, for locking the breech at the time of firing and allowing it to be rotated by hand at other times; also, in the use of a double trigger-spring, or spring and lever, for the purpose hereinafter set forth.

In the several drawings, *a* is the stock of the pistol; *b* is the lock-plate, constructed in the ordinary manner; *c* is the barrel; *d* is the rotating chambered breech, which are constructed and connected together in the manner described in the specification accompanying Letters Patent of the United States granted to me on the 25th April, 1854, and which I need not here more particularly describe.

The spindle *e* passes through the exact center of the rotating chambered breech *d*, which revolves around it. The mode of fastening the barrel and breech to the frame of the pistol is, however, somewhat different from that described in the specification attached to my former patent. The lock-plate *b*, being of the shape shown in Fig. 4, does not extend as far as the bracket *h* of the barrel *c*, but has a projecting pin, *g*, which enters into a corresponding groove in the pistol-frame. The bracket *h* of the barrel, being attached to the rotating breech by the tubular extension and sustained by the spindle, as described in my former patent, is fastened to the lock-plate $b$ by a screw, $s$, which may readily be removed, when the barrel and rotating breech may be taken apart.

The shape and construction of the rotating breech $d$ is seen in Fig. 2 and in section in Fig. 1. The neck of the breech enters into a circular recess in the lock-plate around the base of the spindle. (Shown clearly in Fig. 4.) At the extremity of the neck of the rotating breech are ratchets $i$ $i$, equal in number to the number of chambers in the breech. These ratchets or projecting points need not project far, being only intended to catch against the point of the finger $k$, which operates, as hereinafter described, to rotate the breech.

Near the extremity of the neck of the rotating breech $c$ the circumference of the neck, which elsewhere is circular, is of the shape shown at $l$ in Fig. 2, with flattened sides, the number of sides being the same as the number of chambers in the breech, that portion of the rotating breech thus forming a sort of polygonal cylinder, so that a section of that portion of the neck at right angles to the axis of a chambered breech in a pistol with six chambers would give a regular hexagon, there being one flat side immediately opposite each chamber in the breech.

The several pieces of the lock are shown (with the exception of the locking-bolt) in Fig. 1, the locking-bolt, with its spring, being shown in Fig. 4. The reverse side of the several parts is shown in Fig. 3.

$m$ is the hammer, which turns on the hammer-pin $a'$.

$f$ is the mainspring, attached to the lock-frame and passing up through the hollowed stock of the pistol. The extremity of the mainspring rests on a friction-roller, $n$, at the heel of the hammer, which forces it down when released from the trigger.

The under side of the hammer is broad and curved, and comes to a point, or nearly so, at the toe. The front edge of the hammer is chamfered or beveled, and from being broad at the base gradually narrows to an edge at the top of the recess in the side of the hammer, (see Figs. 3 and 6,) made to allow of the passage of the trigger.

The trigger $o$ is of the shape shown in Fig. 7. It works in the lock on the trigger-pin $a^2$. Near the point the trigger is reduced to half its thickness by a recess made to allow of the passage of the toe of the hammer $m$. In this recess, and near the point of the trigger, is the vibrating stud $p$, which is a short steel rod or stud, with a rounded projecting point and flat head, inserted in a cylindrical bore in the trigger. It is kept in its place in the trigger by the fine spring $r$, inserted in a groove in the trigger, (shown in Fig. 3,) the head of the stud preventing its being forced out of the trigger by the spring $r$. This stud is fitted nicely into its hole, so that, while it vibrates back and forth when pressed in the direction of its axis, it remains firm when the projecting side of the stud presses against the toe of the hammer.

The cam-shoulder $q$ serves as a bearing-point of the spring-lever $t$, which transmits to the trigger the force of the spring $u$, the spring-lever resting on a friction-roller, $v$, in the shoulder. The spring-lever $t$ and spring $u$ form a double spring, which is very useful where a strong spring is required, and where a great deal of play is also necessary, being more efficient and less liable to get out of order. The arrangement is as follows: The spring-lever $t$ is placed, with its point resting on the friction-roller $v$, in the shoulder of the trigger, and the other extremity, which has a circular hole through it, slipped over a pin, $w$, (see Fig. 5,) in the base of the lock-plate. This spring-lever is not screwed or otherwise fastened down, but is kept in place by the point of the strong spring $u$, the base of which is fastened to the under side of the lock-plate (see Fig. 5) by a screw, $s'$, which screws into a small hole, $x$.

In Fig. 1 the relative position of the hammer and trigger before firing and the position of the vibrating stud $p$ are clearly shown. The base of the hammer, near its toe, rests on the side of the vibrating stud $p$. The relative positions of the center-pins $a'$ and $a^2$ are so adjusted that when the trigger is drawn back the stud $p$, pressing on the broad base of the toe of the hammer, raises it up, the hammer, as it rises, pressing down the mainspring $f$. As the hammer rises, the turning-point $a'$ being stationary, the point $a^3$, (being the center of the friction-wheel at the heel of the hammer,) which receives the whole pressure of the mainspring $f$, gradually descends until the trigger is drawn back so far as to to raise the hammer to the point of full-cock, (shown in Fig. 2,) when the center $a^3$ is almost immediately under the center $a'$, thus gradually reducing the pressure of the mainspring $f$ on the heel of the hammer, so that the force required to raise the hammer gradually diminishes as the hammer rises to full-cock, at which point (attained in Fig. 2) a very slight touch on the trigger is enough to fire the pistol. This arrangement of the centers $a'$ and $a^2$ is the same, substantially, as described in the specification to my patent of April 25, 1854, and for the same purpose. When the hammer is thus raised to full-cock the piece is fired by a slight touch on the trigger, which is sufficient to press the vibrating stud $p$ upward over the toe of the hammer, which immediately falls with increasing force against the nipple of the breech. As soon as the trigger is released after firing it recedes or flies back to its first position, the vibrating stud $p$ sliding up the chamfered edge of the hammer until it comes to the position shown in Fig. 3, when it passes over the edge of the hammer at the point marked $z$ in Fig. 6, where the edge is thinnest, and slipping down the beveled side (the spring $r$ allowing the stud $p$ to recede into the trigger as the thickness of the hammer increases) until it reaches the base of the hammer, the stud slips off its edge and the trigger resumes its place, as shown in Fig. 1, with the edge of the stud lying under the toe of the hammer, ready for repeated action. Although the hammer thus raised by pulling the trigger will stand at full-cock, as just described, if the trigger be carefully drawn back until the pressure of the mainspring is no longer perceptible to the finger, yet, as this requires a delicate touch, in order to render it easier to cock the hammer by the trigger and insure it standing in that position, if desired, I make a slight notch or depression, $i'$, in the under side of the toe of the hammer, (seen in Fig. 2 immediately in front of the vibrating stud,) which operates as follows: When the hammer is raised by the vibrating stud $p$ in pulling back the trigger to the position shown in Fig. 2, the edge of the vibrating stud is near the notch $i'$, and in drawing the trigger a little farther back the stud $p$ slips into the notch with a slight click, causing a sensation very perceptible to the finger of the person using the pistol, and thus indicating when the pistol is cocked. The stud $p$ will then rest in the notch $i'$ at the toe of the hammer, (although the notch is very slight,) and thus remain securely at full-cock. In this position mere pressure on the hammer will not fire the pistol, as the notch in the hammer will only the more firmly hold the vibrating stud of the trigger in its place, but a slight pull of the trigger will raise the hammer slightly, and the vibrating stud $p$ will pass out of the notch $i'$ and over the extremity of the hammer, when the hammer, being liberated, immediately descends and fires the pistol. This notch $i'$ in the toe of the hammer is not designed to be used in combination with a pawl or other mechanical contrivance to sustain the hammer at full-cock, for the hammer constructed and arranged as described will stand cocked without any notch. Its function is, in combination with the laterally-vibrating stud, the more easily to retain the hammer at cock by preventing the liability of the toe of the hammer slipping off the side of the stud, which, owing to its capacity to rotate on its axis in its socket, is apt to slip away from its bearing, and also to denote by a slight motion and click perceptible to the finger of the operator, when the hammer arrives at the point of full-cock, as before stated. This notch $i'$ in the toe of the hammer presents no obstacle to the firing of the pistol by raising the trigger without pausing at full-cock, as the pistol will fire if the trigger is pulled back to its full extent at once. The pistol may thus be cocked by simply pulling the trigger, and afterward fired, or fired at once without standing cocked, as described, either with or without a notch in the toe of the hammer. It will be noticed that the purpose of this notch in the toe of the hammer is not to receive any pawl, rest, or catch to prevent the fall of the hammer, because at that point, and until the hammer is farther drawn back, the hammer has no inclination to fall, and would stand at cock without the notch, but simply, in connection with the vibrating stud or point of the trigger, to indicate, as above stated, the arrival of the hammer at full-cock, and render the pistol less liable to unintentional discharge. After the pistol has been fired and the parts have resumed their first position the breech is rotated for a second discharge by means of a finger, $k$, operated by the trigger. This finger $k$ has a pin, $a^5$, projecting from one side, near its lower end, which enters into a corresponding circular hole in the side of the trigger, between the vibrating stud and the center-pin $a^2$. The finger $k$ lies in the recess $y$ in the side of the lock-plate, (see Fig. 3,) and when the trigger is not drawn back does not come in contact with the ratchets $i$ $i$ on the rotating breech, as seen in Fig. 1. This recess opens into a circular recess around the base of the spindle, in which recess around the base of the spindle the neck of the rotating breech is inserted. The spring $c'$ at the back of the finger $k$ rests against the wall of the recess and presses the finger $k$ forward. As the trigger is drawn back in firing the pistol it raises the finger $k$, causing it to enter the circular recess in which the ratchets $i$ $i$ are situated, and, pressing against the nearest one of them, raises it up, thus, with the aid of the locking-bolt $j$, as hereinbefore explained, turning the rotating breech just far enough to bring another loaded chamber exactly on a line with the barrel, in which position the rotating breech is retained by the pressure of the edge of the locking-bolt against the polygonal neck of the breech, which pressure is effected by the action of the shoulder $g'$ of the trigger on the locking-bolt when the pistol is cocked and until the pistol is fired, after which the parts resume their first position for repeated action. Thus, when the pistol is cocked by raising the trigger, not only is the trigger held back in a drawn position, ready to fire at the slightest touch, but the breech also is retained in its proper position and prevented from rotating or getting out of place until the pistol is fired. By the falling of the trigger after firing the finger $k$ is withdrawn and resumes its first position. The locking-bolt $j$ (the shape of which is more clearly shown in Fig. 8) is designed to lock the rotating chambered breech in its proper position at the moment of firing, leaving it at all other times free to be rotated by the finger $k$ or by hand, at pleasure.

In Fig. 4 the locking-bolt $j$ is shown in place in a recess in the side of the lock-plate, made for its reception. The spring $c^2$, which fits into a notch in the wall of the recess, presses against the leg of the locking-bolt and presses the head $o'$ of the bolt through an opening, $e'$, (see Fig. 5,) in the circular recess around the spindle $e$. The locking-bolt $j$ is supported and turns on the center-pin $a^4$. It will be seen by Fig. 8 that the head $o'$ of the locking-bolt $j$ has a flat surface. This surface rests against the sides of one of the hexagonal parts $l$ of the neck of the rotating chambered breech, which enters the recess around the spindle $e$. (See Fig. 2.) Now, the neck $l$ of the rotating chambered breech having as many sides as there are chambers in the breech, whenever the breech is turned round, by hand or otherwise, the flat head of the locking-bolt $j$, pressing, by means of the spring $c^2$, on the hexagonal neck $l$, causes the breech always to rest in such a position that one of the chambers is in exact line with the barrel, and the spring $c^2$ is strong enough to prevent the breech turning round accidentally, and yet permits it to be rotated freely when desired. When the trigger is drawn back to the point of full-cock, or nearly so, as in Fig. 2, a hump or cam-shoulder, $g'$, on the top of the trigger comes in contact with the under side of the head $o'$ of the locking-bolt, as in Fig. 2, and presses the face of the head of the bolt firmly against one of the flat sides of the hexagonal neck of the rotating breech, thus preventing the possibility of the rotating of the breech during the firing and until the trigger is released.

This arrangement is peculiarly convenient, as it enables a person in loading the breech to rotate it freely without touching the trigger, whereas in fire-arms as ordinarily constructed the trigger must be drawn part way back to release the locking apparatus, and held in that position before the breech can be turned by hand.

The advantages which my improved pistol possesses over other revolving-breech fire-arms with which I am acquainted are its simplicity of construction, which renders it less liable to get out of repair or miss fire, the ease and rapidity with which it may be loaded, and the facility with which it may be made either to stand at full-cock or fire at once by simply pulling the trigger.

Having thus described my improvement in revolving-breech fire-arms, what I claim as my invention, and desire to secure by Letters Patent, is—

1. The use of a stud in the trigger, vibrating laterally, in combination with a bevel-edged hammer, for the purpose of raising the hammer to full-cock and firing the piece by simply pulling the trigger, which, after the discharge of the piece, will regain its position for repeated action; or, as a mere modification of arrangement, the use of a stud in the hammer, vibrating laterally, in combination with a bevel-edged trigger, for the purposes above specified.

2. The use of a bevel-edged hammer, with or without a notch in its toe, and trigger with vibrating stud, and cam for the trigger-spring, constructed and arranged substantially as hereinbefore described, for the purpose of causing the hammer, trigger, and revolving breech to assume their proper relative positions at full-cock by simply pulling the trigger, and retaining them in that position and securing the breech from rotation or displacement preparatory to firing.

3. The notch or depression in the toe of the hammer, at the point of contact of the stud and edge of the hammer, in combination with the laterally-vibrating stud, for the purpose of preventing the slipping of the stud and the more easy retention of the hammer at the point of full-cock, substantially as described.

4. The mode hereinbefore described of locking the rotating breech at the moment of firing by means of the locking-bolt operated by the trigger, in combination with the hexagonal neck of the rotating breech, which nevertheless permits the breech to be freely rotated, by hand or otherwise, when the trigger is not drawn back.

5. The use of a double trigger-spring or spring and lever, for the purpose hereinbefore set forth.

JOSIAH ELLS.

Witnesses:
W. BAKEWELL,
MARTIN G. CUSHING.